US012104774B1

(12) United States Patent
Liao

(10) Patent No.: US 12,104,774 B1
(45) Date of Patent: Oct. 1, 2024

(54) ANGLE ADJUSTMENT DEVICE FOR LIGHTING SOFTBOX

(71) Applicant: Tsun-Chi Liao, Taichung (TW)

(72) Inventor: Tsun-Chi Liao, Taichung (TW)

( * ) Notice: Subject to any disclaimer, the term of this patent is extended or adjusted under 35 U.S.C. 154(b) by 0 days.

(21) Appl. No.: 18/537,041

(22) Filed: Dec. 12, 2023

(51) Int. Cl.
*F21V 21/28* (2006.01)
*F21V 21/108* (2006.01)

(52) U.S. Cl.
CPC ............ *F21V 21/28* (2013.01); *F21V 21/108* (2013.01)

(58) Field of Classification Search
CPC ........ F21V 21/28; F21V 21/108; F21V 21/22; F21V 21/14; G03B 15/06
See application file for complete search history.

(56) References Cited

U.S. PATENT DOCUMENTS 2,810,819 A * 10/1957 Gibson .................. F16M 11/28 280/764.1
3,462,591 A * 8/1969 Pichard .................. G03B 27/16 362/17
4,233,647 A * 11/1980 Andersen ............... G03B 15/03 396/419
7,497,603 B2 * 3/2009 Malkanov ............... F21V 17/10 362/16
2018/0363709 A1 * 12/2018 Chen ......................... F16H 1/16

OTHER PUBLICATIONS

Parts List of Manfrotto, Superboom with Column Stand—025TM, Nov. 8, 2017, 3 pages.

* cited by examiner

*Primary Examiner* — Leah Simone Macchiarolo
(74) *Attorney, Agent, or Firm* — MUNCY, GEISSLER, OLDS & LOWE, P.C.

(57) ABSTRACT

An angle adjustment device for lighting softbox includes an operating device, a first connecting rod, a second connecting rod, and a controlled device which are connected in series. The first/second connecting rod is provided with a first/second outer tube, a first/second inner tube and a first/second inner rod, one side of the first/second inner tube close to the operating device is provided with a first/second non-circular fixing base, and one side of the first inner tube distanced from the operating device is provided with a clamping fixing base; and the controlled device is provided with a rotary portion, an outer tube fixing base and a plurality of screw positioning beads, the plurality of screw positioning beads surround the outer tube fixing base and pass through the outer tube fixing base and the second outer tube, and the plurality of screw positioning beads abutting against the rotary portion.

10 Claims, 6 Drawing Sheets

ANGLE ADJUSTMENT DEVICE FOR LIGHTING SOFTBOX

FIELD OF THE INVENTION

The present invention relates to an angle adjustment device, and more particularly relates to an angle adjustment device for a lighting softbox.

BACKGROUND OF THE INVENTION

A lighting softbox angle adjustment device, such as the commercially available product Superboom with Column Stand-025TM produced by Manfrotto, is provided with a long rod to be erected on a bipod, the long rod is respectively provided with an operating device and a controlled device at two ends of the bipod, the controlled device is used for erecting a lighting softbox, while the operating device is provided with two cranks, and the two cranks can be rotated to respectively change an axial inclination angle and an axial rotation angle in a transmission way.

In order to increase an effective irradiation range of the lighting softbox, a design specification of the long rod is often greater than 3 meters, which causes trouble for a user due to the inability to transport the long rod by an ordinary sedan.

SUMMARY OF THE INVENTION

The main object of the present invention is to disclose an angle adjustment device for a lighting softbox that can be disassembled into a first connecting rod and a second connecting rod which are originally connected in series, so as to shorten a length thereof to be transported by an ordinary sedan.

In order to achieve the above object, the present invention relates to an angle adjustment device for a lighting softbox, including an operating device, a first connecting rod, a second connecting rod, and a controlled device, wherein the operating device is provided with a rotary crank, an inclined crank, a rotary transmission assembly and an inclined transmission assembly, and the rotary transmission assembly and the inclined transmission assembly are driven by the rotary crank and the inclined crank to be rotatable around an axial direction respectively.

The first connecting rod is provided with a first outer tube, a first inner tube and a first inner rod, wherein one end of the first outer tube is linked and fixed to the operating device, the first inner tube is positioned in the first outer tube, the first inner rod is positioned in the first inner tube, one end of the first inner tube is provided with a first non-circular fixing base, the first non-circular fixing base is provided with a first fixing portion for fixing the first inner tube and matching an inner diameter of the first outer tube by an outer diameter thereof, and a first non-circular fixing tube connected to the first fixing portion, and an outer diameter of the first non-circular fixing tube is smaller than the first fixing portion, the rotary transmission assembly is in transmission connection to the first non-circular fixing tube, the inclined transmission assembly is in transmission connection to the first inner rod, the other end of the first inner tube is provided with a clamping fixing base, and the clamping fixing base is provided with a clamping fixing portion for fixing the first inner tube and a clamping non-circular fixing tube connected to the clamping fixing portion and matched with the inner diameter of the first outer tube by an outer diameter thereof.

The second connecting rod is provided with a second outer tube, a second inner tube and a second inner rod, wherein the second inner tube is positioned in the second outer tube, the second inner rod is positioned in the second inner tube, one end of the second inner tube is provided with a second non-circular fixing base, the second non-circular fixing base is provided with a second fixing portion for fixing the second inner tube and matching with an inner diameter of the second outer tube by an outer diameter thereof, and a second non-circular fixing tube connected to the second fixing portion and an outer diameter of the second non-circular fixing tube is smaller than the second fixing portion, the clamping non-circular fixing tube is in transmission connection to the second non-circular fixing tube, the first inner rod is in transmission connection to the second inner rod, and the other end of the first outer tube is linked and fixed to one end of the second outer tube.

The controlled device is provided with a rotary portion, an inclined portion, a mounting column, an outer tube fixing base and a plurality of screw positioning beads, wherein the inclined portion is pivoted to the rotary portion, the mounting column is disposed on the inclined portion, the second inner tube is fixed to the rotary portion, so as to enable the second inner tube and the rotary portion to synchronously rotate in an axial direction, the second inner rod is in transmission connection to the inclined portion to drive the inclined portion to rotate around a direction perpendicular to the axial direction of the rotary portion, and the plurality of screw positioning beads surround the outer tube fixing base and pass through the outer tube fixing base and the second outer tube, and the plurality of screw positioning beads abutting against the rotary portion in a relative direction.

Accordingly, the angle adjustment device for the lighting softbox provided by the present invention can be disassembled into the first connecting rod and the second connecting rod, so as to shorten a length thereof to be transported by the ordinary sedan.

DETAILED DESCRIPTION OF THE PREFERRED EMBODIMENTS

The technical contents of the present invention are described as follows with reference to the accompanying drawings.

Figure 1:
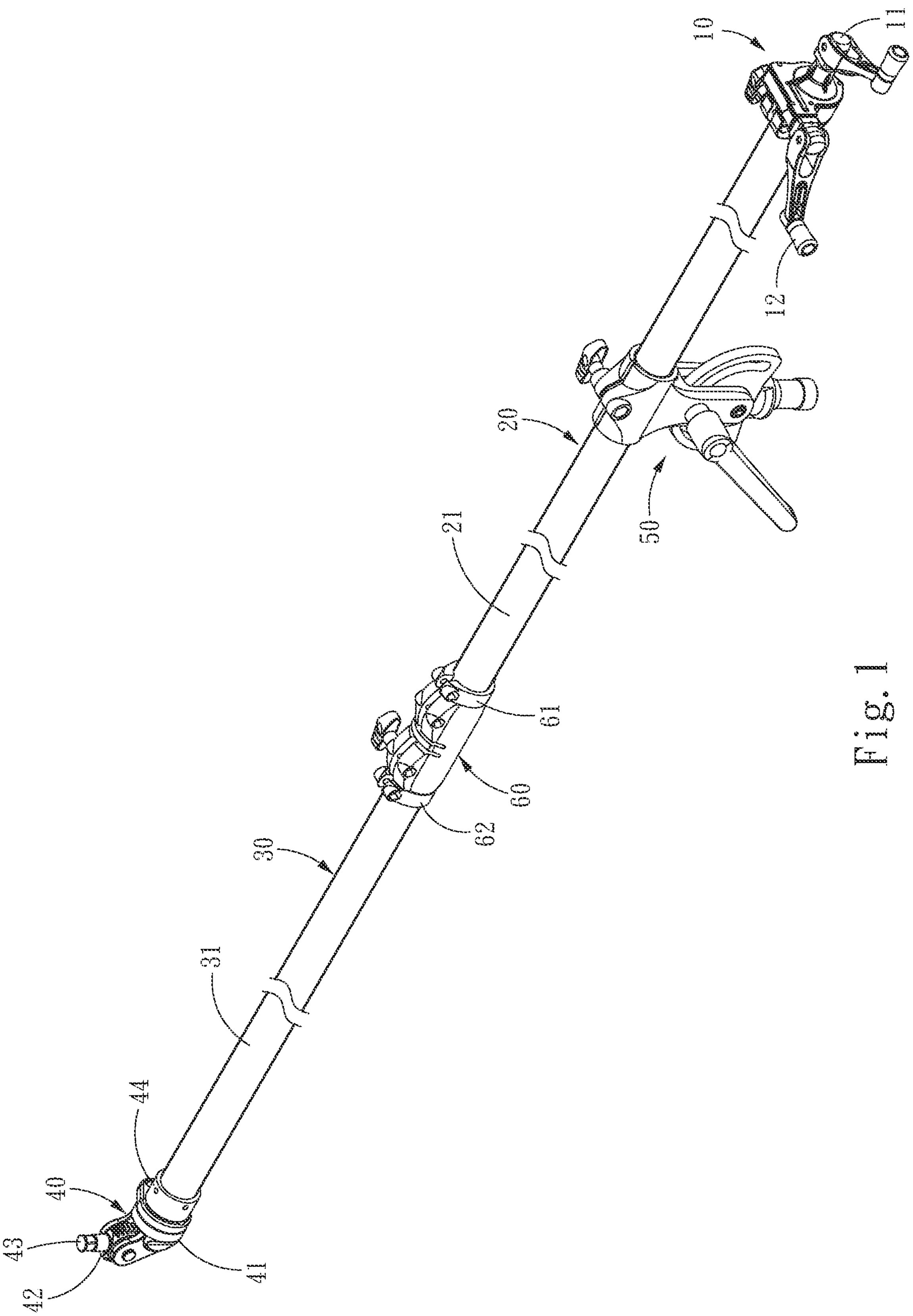
FIG. 1 is a schematic view showing an overall structure of the present invention.
Figure 2:
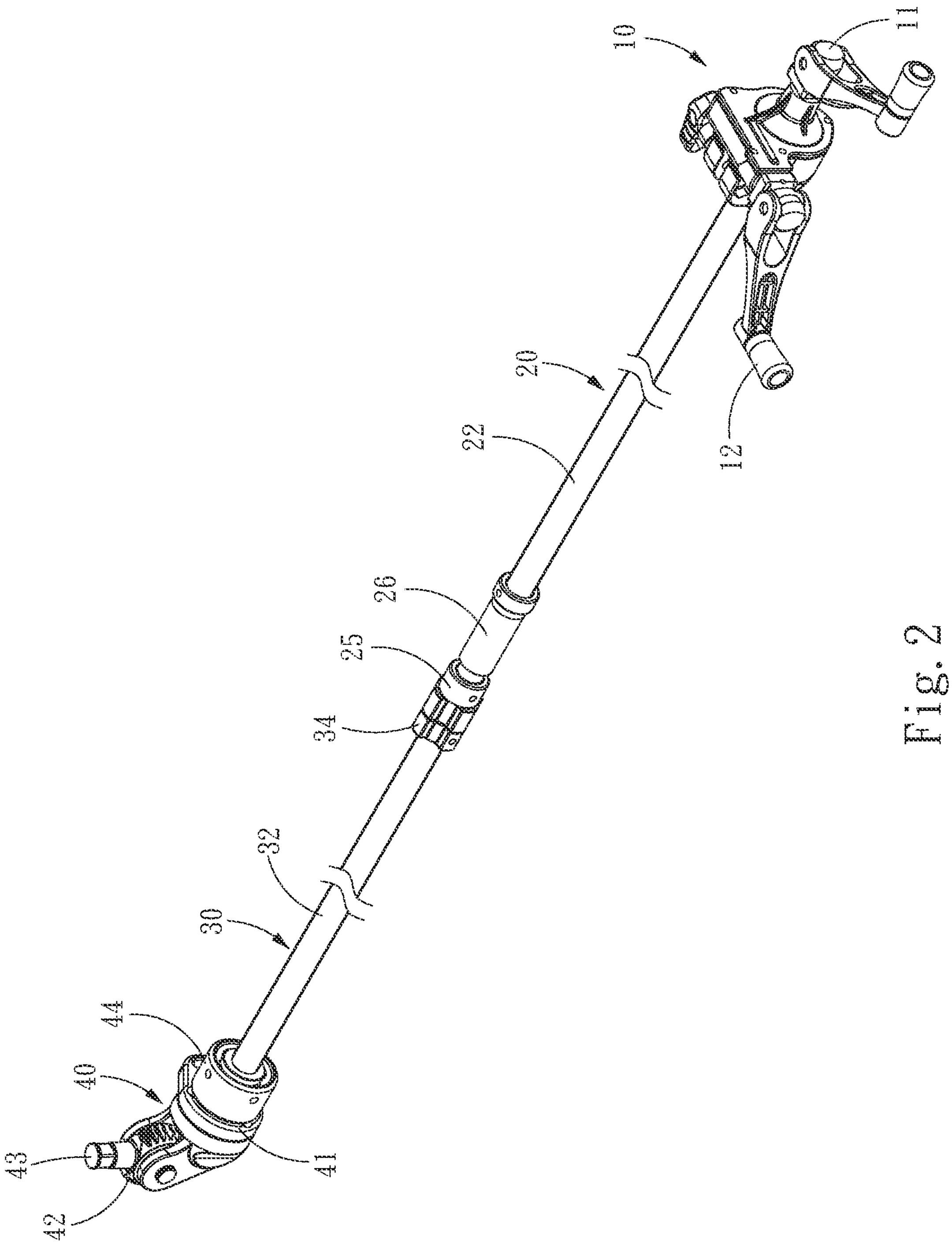
FIG. 2 is a schematic view showing the structure of the present invention with some parts disassembled.
Figure 3:
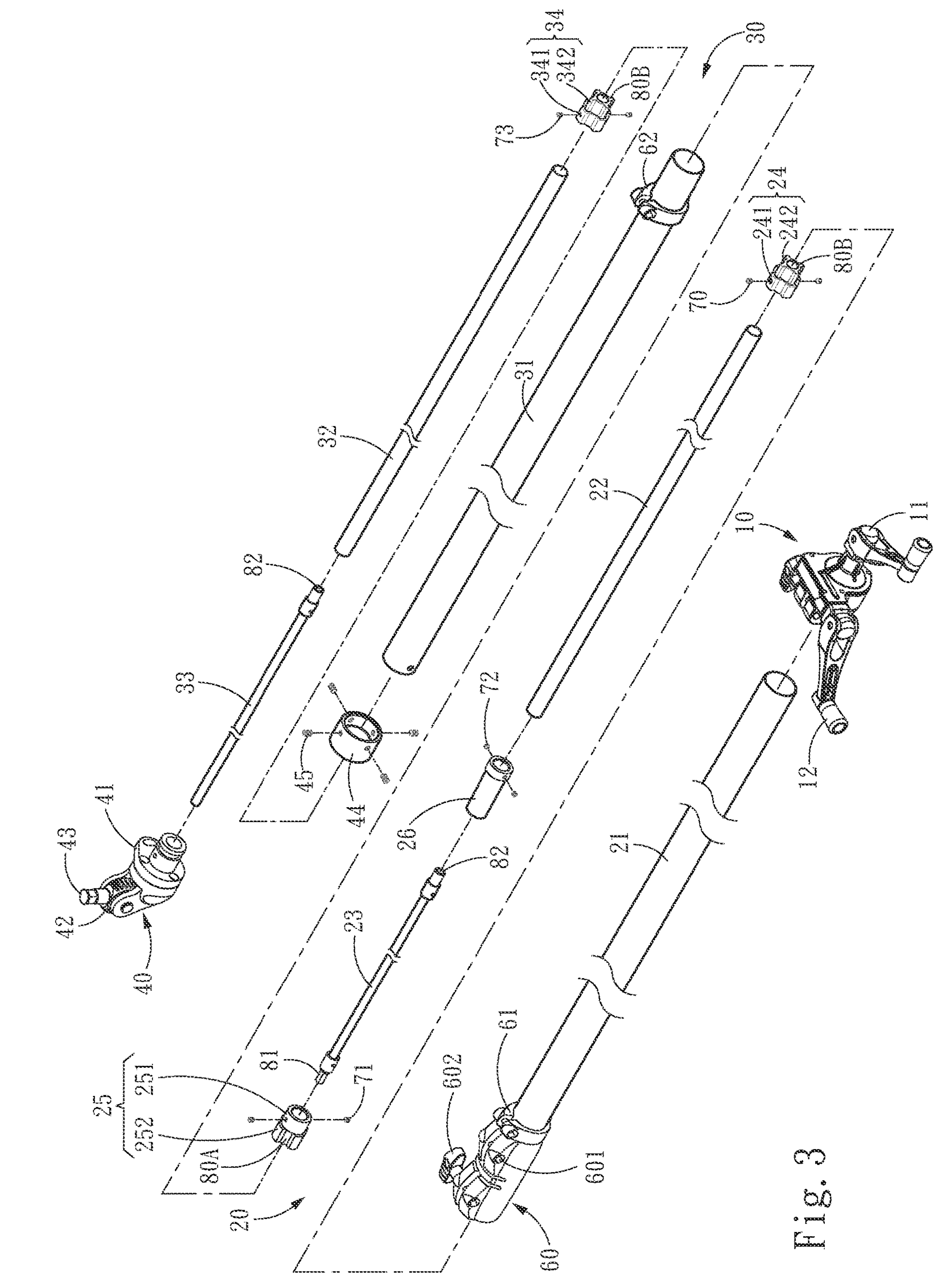
FIG. 3 is an exploded view showing the overall structure of the present invention.
Figure 4:
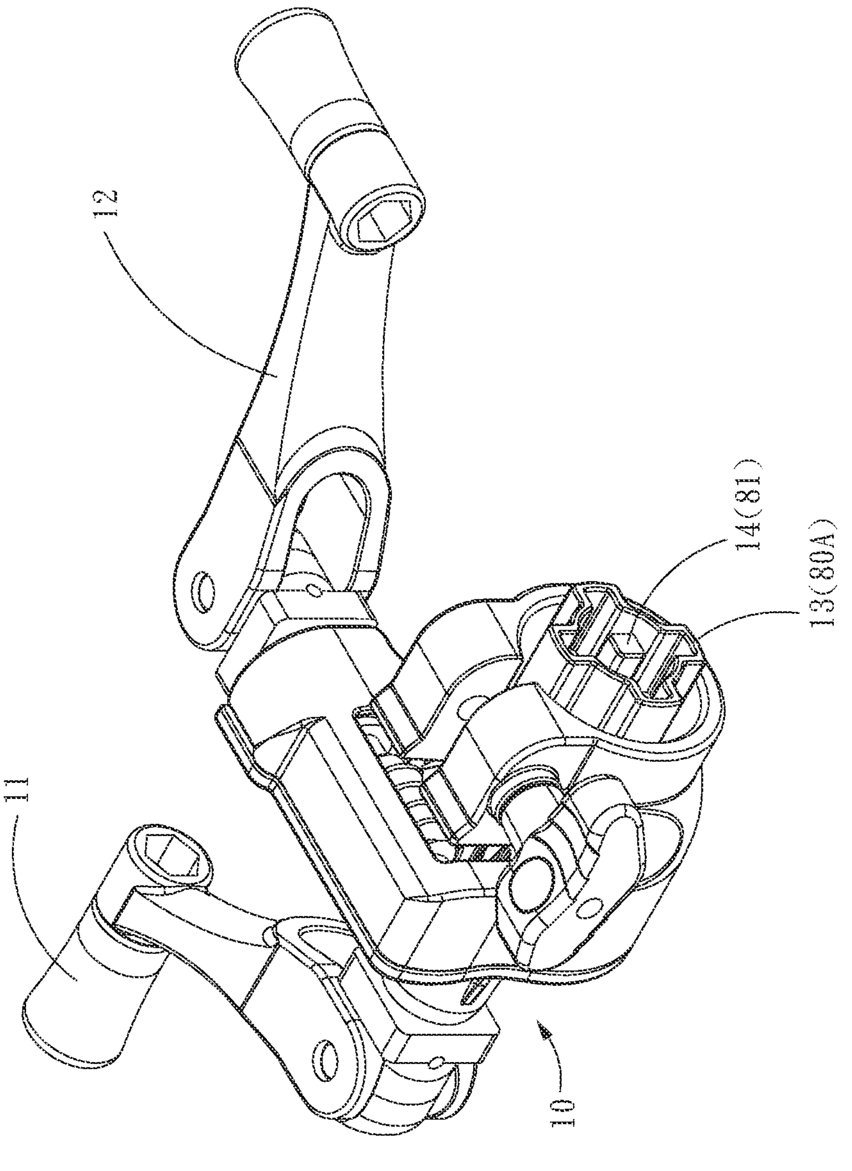
FIG. 4 is a schematic view showing a structure of an operating device of the present invention.

Referring to FIG. 1, FIG. 2 and FIG. 3, the present invention relates to an angle adjustment device for a lighting softbox. The angle adjustment device provided by the present invention includes an operation device 10, a first connecting rod 20, a second connecting rod 30 and a controlled device 40. By referring to FIG. 4, the operating device 10 is provided with a rotary crank 11, an inclined crank 12, a rotary transmission assembly 13 and an inclined transmission assembly 14, wherein the rotary transmission assembly 13 and the inclined transmission assembly 14 are driven by the rotary crank 11 and the inclined crank 12 respectively, to be rotatable in an axial direction. In an example, the rotary crank 11 and the inclined crank 12 rotate around an axis.

Figure 5:
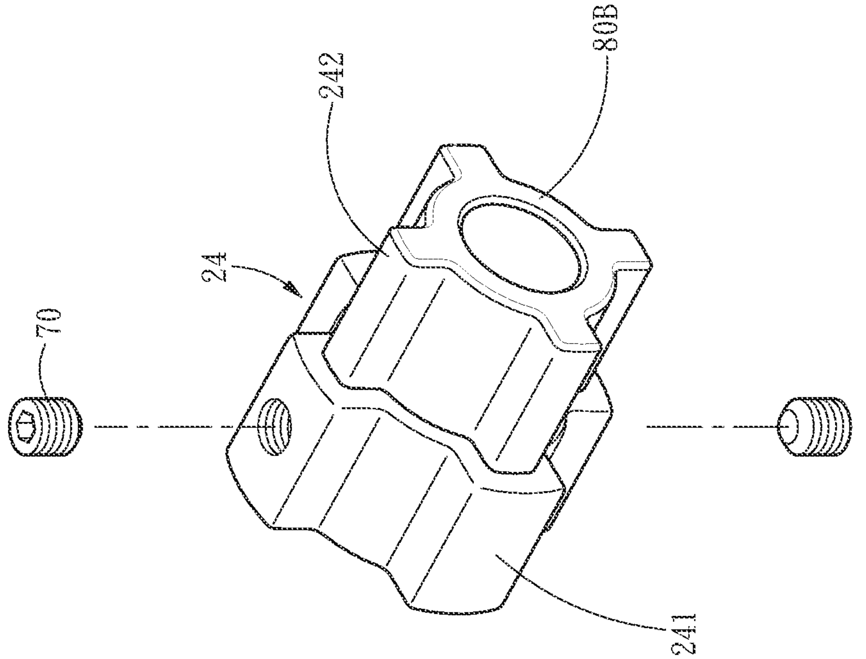
FIG. 5 is a schematic view showing a structure of a first non-circular fixing base of the present invention.

The first connecting rod 20 is provided with a first outer tube 21, a first inner tube 22, and a first inner rod 23, wherein the first outer tube 21 is erected on an angle adjustment base 50, and one end of the first outer tube 21 is linked and fixed to the operating device 10. The first inner tube 22 is positioned in the first outer tube 21, and the first inner rod 23 is positioned in the first inner tube 22. By referring to FIG. 5, one end of the first inner tube 22 is provided with a first non-circular fixing base 24, the first non-circular fixing base 24 is provided with a first fixing portion 241 and a first non-circular fixing tube 242, the first fixing portion 241 is provided for fixing the first inner tube 22 and matches an inner diameter of the first outer tube 21 by an outer diameter thereof. In an example, the first fixing portion 241 is fixed to the first inner tube 22 by a plurality of bolts 70 passing through thereof, and the first non-circular fixing tube 242 is connected to the first fixing portion 241, and an outer diameter of the first non-circular fixing tube 242 is smaller than the first fixing portion 241. The rotary transmission assembly 13 is in transmission connection to the first non-circular fixing tube 242, and the inclined transmission assembly 14 is in transmission connection to the first inner rod 23.

The other end of the first inner tube 22 is provided with a clamping fixing base 25, and the clamping fixing base 25 is provided with a clamping fixing portion 251 and a clamping non-circular fixing tube 252, the clamping fixing portion 251 is provided for fixing the first inner tube 22. In an example, the clamping fixing portion 251 is fixed to an extension tube 26, then the extension tube 26 is fixed to the other end of the first inner tube 22, and the clamping fixing portion 251 is fixed to the extension tube 26 by a plurality of bolts 71 passing through thereof, and the extension tube 26 is fixed to the first inner tube 22 by a plurality of bolts 72 passing through thereof. The clamping non-circular fixing tube 252 is connected to the clamping fixing portion 251 and matches the inner diameter of the first outer tube 21 by an outer diameter thereof.

The second connecting rod 30 is provided with a second outer tube 31, a second inner tube 32, and a second inner rod 33, wherein the second inner tube 32 is positioned in the second outer tube 31, and the second inner rod 33 is positioned in the second inner tube 32, one end of the second inner tube 32 is provided with a second non-circular fixing base 34. The second non-circular fixing base 34 is provided with a second fixing portion 341 and a second non-circular fixing tube 342, the second fixing portion 341 is provided for fixing the second inner tube 32 and matching an inner diameter of the second outer tuber 31 by an outer diameter thereof. In an example, the second fixing portion 341 is fixed to the second inner tube 32 by a plurality of bolts passing through thereof. The second non-circular fixing tube 342 is connected to the second fixing portion 341, and an outer diameter of the second non-circular fixing tube 342 is smaller than the second fixing portion 341, the clamping non-circular fixing tube 252 is in transmission connection to the second non-circular fixing tube 342, the first inner rod 23 is in transmission connection to the second inner rod 33, and the other end of the first outer tube 21 is linked and fixed to one end of the second outer tube 31. In an example, the first outer tube 21 and the second outer tube 31 are penetrated into two sides of a tube sleeve 60 respectively, and are fixed to the tube sleeve 60 by a fixing screw 601 and a thumb screw 602 respectively. The thumb screw 602 can be directly locked or loosened by manual operation to facilitate disassembly. Moreover, the first outer tube 21 and the second outer tube 31 are sleeved and fixed with a limiting sleeve 61, 62 respectively, and the two limiting sleeves 61, 62 are adjacent to two sides of the tube sleeve 60. The limiting sleeve 61 and the limiting sleeve 62 can limit lengths of the first outer tube 21 and the second outer tube 31 penetrating into the tube sleeve 60.

Figure 6:
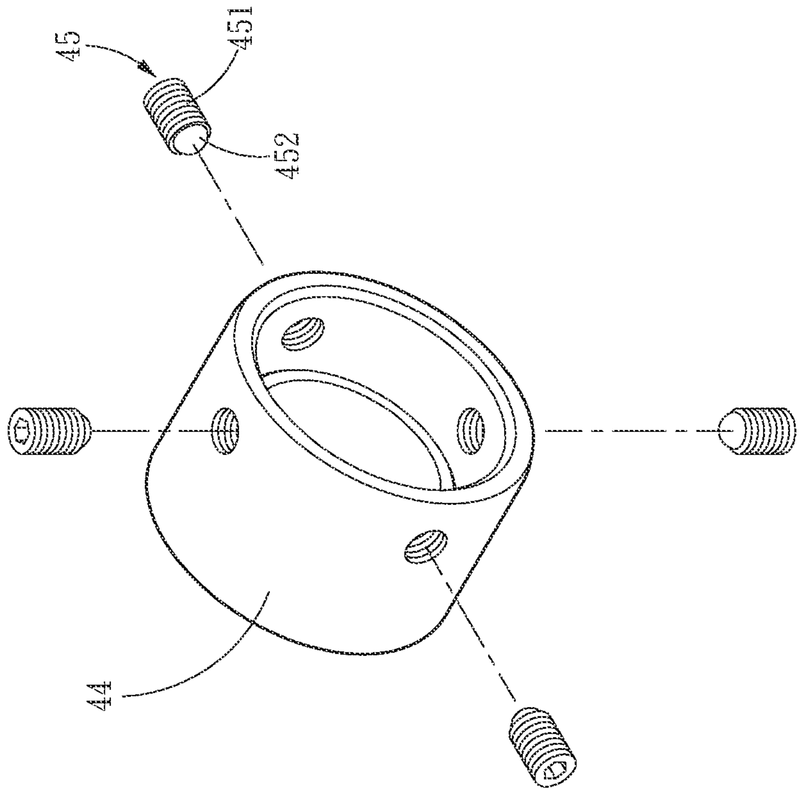
FIG. 6 is a schematic view showing a structure of an outer tube fixing base of the present invention.

With reference to FIG. 6, the controlled device 40 is provided with a rotary portion 41, an inclined portion 42, a mounting column 43, an outer tube fixing base 44 and a plurality of screw positioning beads 45, wherein the inclined portion 42 is pivoted to the rotary portion 41, the mounting column 43 is disposed on the inclined portion 42, the second inner tube 32 is fixed to the rotary portion 41 to enable the second inner tube 32 and the rotary portion 41 to synchronously rotate in an axial direction, the second inner rod 33 is in transmission connection to the inclined portion 42 to drive the inclined portion 42 rotating around a direction perpendicular to the axial direction of the rotary portion 41, and the plurality of screw positioning beads 45 surround the outer tube fixing base 44 and pass through the outer tube fixing base 44 and the second outer tube 31, and the plurality of screw positioning beads 45 abuts against the rotary portion 41, namely, the outer tube fixing base 44 and the second outer tube 31 are fixed together through the penetration of the plurality of screw positioning beads 45. In an example, the plurality of screw positioning beads 45 include a screw 451 and a steel bead 452 positioned at a front end of the screw 451, the steel bead 452 has a universal rotational degree of freedom and abuts against the rotary portion 41.

In addition, the rotary transmission assembly 13 is in transmission connection to the first non-circular fixing tube 242, and the clamping non-circular fixing tube 252 is in transmission connection to the second non-circular fixing tube 342. In an example, a junction of the rotary transmission assembly 13 and the first non-circular fixing tube 242 is cross-shaped tubular side ends 80A, 80B matched with each other in size and contour, while a junction of the clamping non-circular fixing tube 252 and the second non-circular fixing tube 342 is also the cross-shaped tubular side ends 80A, 80B matched with each other in size and contour, the non-circular cross-shaped tubular side ends 80A, 80B are assembled in series to transmit rotational torque to form a transmission connection. The inclined transmission assembly 14 is in transmission connection to the first inner rod 23, and the first inner rod 23 is in transmission connection to the second inner rod 33. In an example, a junction of the inclined transmission assembly 14 and the first inner rod 23 is a square rod side end 81 and a square sleeve side end 82 matched with each other, while a junction of the first inner rod 23 and the second inner rod 33 is also the square rod side end 81 and the square sleeve side end 82 matched with each other, and the non-circular square rod side end 81 and the square sleeve side end 82 are assembled in series to transmit rotational torque to form a transmission connection.

As described above, the present invention at least includes the following characteristics.

1. A detachable design allows for a shorter overall length and can be transported in a regular sedan for cost savings.

2. Through the design of the plurality of screw positioning beads surrounding the outer tube fixing base and passing through the outer tube fixing base and the second outer tube, and oppositely abutting against the rotary portion, the second inner rod and the second inner tube can stably rotate relative to the second outer tube, and the second outer tube can be prevented from falling off.

3. Through the non-circular cross-shaped tubular side ends, the square rod side ends and the square sleeve side ends can be assembled in series to transmit rotational torque to form a transmission connection.

What is claimed is:

1. An angle adjustment device for a lighting softbox, comprising:

an operating device, comprising a rotary crank, an inclined crank, a rotary transmission assembly and an inclined transmission assembly, wherein the rotary transmission assembly and the inclined transmission assembly being driven by the rotary crank and the inclined crank to be rotatable around an axial direction respectively;

a first connecting rod, provided with a first outer tube, a first inner tube positioned in the first outer tube, and a first inner rod positioned in the first inner tube, one end of the first outer tube being linked and fixed to the operating device, one end of the first inner tube being provided with a first non-circular fixing base, the first non-circular fixing base being provided with a first fixing portion for fixing the first inner tube and matching an inner diameter of the first outer tube by an outer diameter thereof, and a first non-circular fixing tube connected to the first fixing portion, an outer diameter of the first non-circular fixing tube is smaller than the first fixing portion, the rotary transmission assembly being in transmission connection to the first non-circular fixing tube, the inclined transmission assembly being in transmission connection to the first inner rod, the other end of the first inner tube being provided with a clamping fixing base, and the clamping fixing base being provided with a clamping fixing portion for fixing the first inner tube and a clamping non-circular fixing tube connected to the clamping fixing portion and matched with the inner diameter of the first outer tube by an outer diameter thereof;

a second connecting rod, provided with a second outer tube, a second inner tube positioned in the second outer tube, and a second inner rod positioned in the second inner tube, one end of the second inner tube being provided with a second non-circular fixing base, the second non-circular fixing base being provided with a second fixing portion for fixing the second inner tube and matching with an inner diameter of the second outer tube by an outer diameter thereof, and a second non-circular fixing tube connected to the second fixing portion and an outer diameter of the second non-circular fixing tube is smaller than the second fixing portion, the clamping non-circular fixing tube being in transmission connection to the second non-circular fixing tube, the first inner rod being transmission connection to the second inner rod, and the other end of the first outer tube being linked and fixed to one end of the second outer tube; and a controlled device, provided with a rotary portion, an inclined portion pivoted to the rotary portion, a mounting column disposed on the inclined portion, an outer tube fixing base and a plurality of screw positioning beads, the second inner tube being fixed to the rotary portion, the second inner rod being in transmission connection to the inclined portion to drive the inclined portion to rotate around a direction perpendicular to the axial direction of the rotary portion, and the plurality of screw positioning beads surrounding the outer tube fixing base and passing through the outer tube fixing base and the second outer tube, and the plurality of screw positioning beads abutting against the rotary portion.

2. The angle adjustment device of claim 1, wherein the first fixing portion is fixed to the first inner tube by a plurality of bolts passing through thereof, and the second fixing portion is fixed to the second inner tube by a plurality of bolts passing through thereof.

3. The angle adjustment device of claim 1, wherein the first outer tube is erected on an angle adjustment base.

4. The angle adjustment device of claim 1, wherein the clamping fixing portion is fixed to an extension tube, and then the extension tube is fixed to the other end of the first inner tube.

5. The angle adjustment device of claim 4, wherein the clamping fixing portion is fixed to the extension tube by a plurality of bolts passing through thereof, and the extension tube is fixed to the first inner tube by a plurality of bolts passing through thereof.

6. The angle adjustment device of claim 1, wherein a junction of the rotary transmission assembly and the first non-circular fixing tube, and a junction of the clamping non-circular fixing tube and the second non-circular fixing tube are cross-shaped tubular side ends that matched with each other in size and contour.

7. The angle adjustment device of claim 1, wherein a junction of the inclined transmission assembly and the first inner rod, and a junction of the first inner rod and the second inner rod are a square rod side end and a square sleeve side end that matched with each other.

8. The angle adjustment device of claim 1, wherein the first outer tube and the second outer tube penetrate into two sides of a tube sleeve respectively, and are fixed to the tube sleeve by a fixing screw and a thumb screw respectively.

9. The angle adjustment device of claim 8, wherein the first outer tube and the second outer tube are sleeved and fixed with a limiting sleeve respectively, and the two limiting sleeves are adjacent to two sides of the tube sleeve.

10. The angle adjustment device of claim 1, wherein the plurality of screw positioning beads comprise a screw and a steel bead positioned at a front end of the screw, the steel bead has a universal rotational degree of freedom, and abuts against the rotary portion.

* * * * *